US006963656B1

(12) United States Patent
Persaud et al.

(10) Patent No.: US 6,963,656 B1
(45) Date of Patent: Nov. 8, 2005

(54) METHOD AND DEVICE FOR VISUALIZING IMAGES THROUGH SOUND

(75) Inventors: Krishna Chandra Persaud, Cheadle (GB); John Ronald Cronly-Dillon, Bramhall (GB)

(73) Assignee: University of Manchester Institute of Science and Technology, Manchester (GB)

( * ) Notice: Subject to any disclaimer, the term of this patent is extended or adjusted under 35 U.S.C. 154(b) by 0 days.

(21) Appl. No.: 09/700,087

(22) PCT Filed: May 12, 1999

(86) PCT No.: PCT/GB99/01506

§ 371 (c)(1),
(2), (4) Date: Nov. 10, 2000

(87) PCT Pub. No.: WO99/58087

PCT Pub. Date: Nov. 18, 1999

(30) Foreign Application Priority Data

May 12, 1998 (GB) ............................................. 9809986

(51) Int. Cl.[7] ............................. G06K 9/00; G06K 9/46; G06K 9/66; H04N 7/18; H04N 9/47
(52) U.S. Cl. ......................... 382/100; 382/190; 348/62; 434/116
(58) Field of Search .................................. 382/100, 190, 382/114; 340/825.19; 348/62, 70; 434/112, 116

(56) References Cited

U.S. PATENT DOCUMENTS

| 3,800,082 A | * | 3/1974 | Fish .............................. 348/62 |
| 4,000,565 A | | 1/1977 | Overby et al. |
| 4,322,744 A | | 3/1982 | Stanton |
| 4,378,569 A | * | 3/1983 | Dallas et al. .................. 348/62 |
| 5,097,326 A | * | 3/1992 | Meijer .......................... 348/62 |
| 5,310,962 A | | 5/1994 | Kimpara et al. |
| 6,198,395 B1 | * | 3/2001 | Sussman .................. 340/573.1 |

FOREIGN PATENT DOCUMENTS

| BE | 1003022 | * | 10/1991 |
| EP | 0-410-045 A1 | | 7/1989 |
| FR | 2-595-940 | * | 4/1986 |
| WO | WO82/00395 | | 2/1982 |
| WO | WO 8200395 A1 | * | 2/1982 |

* cited by examiner

Primary Examiner—Daniel Miriam
Assistant Examiner—Shefali Patel
(74) Attorney, Agent, or Firm—Wallenstein Wagner & Rockey, Ltd.

(57) ABSTRACT

A method enabling a person to visualize images including encoding spatial information relating to a feature or features contained within an image into the form of one or more musical sequences, and playing the musical sequence or sequences to the person.

28 Claims, 9 Drawing Sheets

(a)

(b) P.H. (NORMAL SUBJECT)

(c) B.K. (BLIND SUBJECT)

| OBJECT | SEGMENTATION | RESPONSE |
|---|---|---|
| | | STAIRS |
| | NONE | |
| | | BRIDGE WITH ARCHWAY TOPPED BY TRAPEZIUM |
| | | 2 CYLINDERS EACH TOPPED BY CONE AND JOINED BY PAIR OF PARALLEL LINES |

FIG.11

METHOD AND DEVICE FOR VISUALIZING IMAGES THROUGH SOUND

This invention relates to methods and devices enabling a person to visualise images.

The prospect of enabling subjects to visualise images through some external means, circumventing the human visual system, is one of clear significance. In particular, such a system might enable blind persons to "see", or at least assimilate some amount of visual information. Although systems based on echo location and on touch are known, there is at present no available system permitting optical images to be analysed in detail.

The system described here translates visual images into sound. However unlike any of its predecessors such as U.S. Pat. No. 5,097,326 it incorporates a system for feature extraction that is designed to enable a blind subject to selectively deconstruct a complex optical image into a set of simpler representations that make it easier for the subject to analyse. Each representation selectively isolates one or more features in the visual display which is then translated into an equivalent sound pattern. The blind subject listens and analyses these representations one at a time or in combination and uses the combination of sub melodies to mentally reconstruct a representation of the visual target. Provision is also made to enable the subject to examine different portions of the image in a manner that bears some resemblance to the normal scan-path behaviour of the human eye, as it pursues a search pattern of foveations to explore a complex visual object (such as a face), selecting and gathering information in patch-like manner about salient features, which are then assembled to contribute collectively to the final percept and identification of the object. U.S. Pat. No. 5,097,326 discloses a system in which a visual image is pixellated and sinusoidal audio outputs are produced depending on the nature of each pixel. In this system, an audio output of characteristic frequency is associated with each pixel in a column of pixels, and the frequency of the audio output increases as one moves up a column of pixels. Furthermore, the amplitudes of each audio output from a column of Pixels are sum mated, and the sum is played to a listener. To the listener, this summed output can appear rather discordant. Furthermore, with complex images the output is extremely complex, making the detailed analysis of images very difficult.

It is known that there are areas of similarity in the way the human brain interprets visual and auditory information. As with vision, auditory information is partitioned into discrete packages and conveyed to the relevant brain areas for separate processing : human speech sounds such as words and phrases are processed by Wernicke's area in the left hemisphere, where music is processed in the temporal lobe of the right hemisphere. In some animals, there are areas of the brain concerned with spatial perception in which both the visual and auditory topographical maps (involved in the location of objects in the environment by vision or by hearing) are superimposed.

The approach to develop a sensory aid based on sensory substitution was guided by knowledge of the structure and functional organization of the visual system and by neurophysiological, psychophysical and behavioral studied on visual system recognition in a variety of animals. For example, honeybees use a photographic memory to store and recall patterns in a pixel by pixel fashion. However, they also distinguish patterns on the basis of global properties such as radial, circular, and bilateral symmetry. The honeybee's visual system possesses spatial filters for detecting various symmetries. Radial and circular filters have also been discovered in primate vision. This suggest that information about the presence or absence of different types of symmetry in a visual target may sometimes be useful in the differentiation and characterization of visual forms. In addition many insects that lack stereo vision use image-motion cues (differential movement parallax, changing size etc) to obtain information on depth. Image motion may also provide a powerful cue for segregating objects from their background, detecting imminent collisions, and for computing one's own motion. Likewise, the velocity flow field generated on the retina by different portions of a 3-D object as it approaches may produce sufficient information with which to reconstruct its form. These and other strategies such as visual velocity feedback for gaze and course control and the use of specialized scanning patterns for extracting information on specific features appear to be ubiquitous in vertebrate and invertebrate species where vision plays an important role in directing the animal's behaviour. Consequently any system of sense substitution that aims to compensate for the loss of vision, may well require the subject to implement a set of strategies that are functionally similar to those employed by the visual system in its analysis of the spatial and spatiotemporal features of the subject's visual environment.

Subjects appear to be particularly receptive to the use of musical notes, a phenomenon which, as discussed above, may be due to the fundamental mechanisms of information processing in the human brain.

"Spatial information" includes the shape, size, orientation and relative positions of features, as well as finer details such as surface decoration or, for example, the appearance of a face. As will be explained in more detail below, further visual information, such as colour and brightness, and temporal information, i.e. the movement of features, may also be visualised using the present invention. Features can be, for example, three dimensional objects, two dimensional objects such as drawings, or symbols such as letters, words and numbers.

Features may be encoded by selecting a note or chord dependent on the distribution of the feature or features along an axis.

The image may comprise a letter or a number, in which instance the method may be used to convey written information.

The image may comprise the person's environment, in which instance the method may be used as a way of replicating some or all of the scene that the person would view if they were sighted.

Spatial information may be encoded by:
representing the image as a two dimensional (2D) image; and
forming one or more musical sequences, each comprising a series of notes or chords, in which i) each note or chord is selected dependant upon the distribution of the feature or features along a portion of the 2D image and ii) different notes or chords in a sequence correspond to different portions of the 2D image.

The 2D image, or a portion of the 2D image, may be divided into a matrix of pixels, and i) each note or chord may be selected dependent upon the distribution of the feature or features along a column (or row) of pixels and ii) different notes or chords in a sequence may correspond to the distribution of the feature or feature along different columns (or rows) of pixels. A different note may be associated with each pixel along a column and, if a feature is recognised as being present in a pixel, the note corresponding to that pixel comprises part of the musical sequence.

The method may enable a person to visualise moving features, and may comprise the step of playing a plurality of musical sequences corresponding to different positions and/or orientations of the moving feature.

A subset of the full image may be encoded into the musical sequence or sequences. Predetermined features may be extracted from the image, and said predetermined features may be encoded into a musical sequence or sequences. In this way, and in contrast to the method of U.S. Pat. No. 5,097,326, the information content of the image is reduced, and important features are highlighted. This renders the musical sequence or sequences played to the person much more tractable.

A feature may be simplified by encoding a portion of the feature as a musical sequence. The feature may be encoded by encoding different portions of the feature as different musical sequences. This approach greatly assists in the recognition of complex shapes; such shapes can be "broken down" into simpler sub-units. For example, one deconstructed representation might select only vertical lines present in the feature, and represent them in musical form. Another musical sequence might consist only of horizontal lines present in the feature.

The image may be encoded into the form of a plurality of musical sequences which are played to the person as a melody.

The image may be encoded as a plurality of musical sequences, each corresponding to different spatial resolutions. The image may be divided into two or more concentric zones, the zone at the centre of the image being encoded at the highest spatial resolution and the zone furthest from the centre of the image being encoded at the lowest spatial resolution. A feature or features may be visualised by obtaining a plurality of images in a sequence of saccadic movements. An example is the visualisation of a face, in which features such as eyes, nose and mouth are "scanned" at high resolution in a saccadic movement which mimics the operation of the human retina.

The spatial resolution corresponding to a musical sequence may be indicated by the duration of the notes and/or chords in the sequence.

The colour of the feature or features may be encoded by producing a musical sequence or sequences which comprise a plurality of different waveforms mixed in variable ratios, the waveforms being selected so that none of the waveforms may be created by a linear combination of the other two waveforms. Three waveforms may be mixed in variable ratios. The three waveforms, may be produced by filtering a master waveform between different frequency ranges.

The brightness of the feature or features may be encoded by varying the intensity of the musical sequence or sequences.

According to a second aspect of the invention there is provided a device enabling a person to visualise images comprising:

imaging means for obtaining images of a feature or features;

encoding means for encoding spatial information relating to the feature or features according to the first aspect of the invention; and playing means for playing the musical sequence or sequences to the person.

The imaging means may comprise at least one video camera.

The imaging means may comprise at least one charge coupled detector.

The encoding means may comprise a microprocessor.

The playing means may comprise an ear piece.

The device may be portable, in which instance the imaging means may be hand-held.

Methods and devices in accordance with the invention will now be described with reference to the accompanying drawings, in which:

FIG. 11 shows the results from subjects presented with segmented complex shapes.

The invention comprises a method enabling a person to visualise images comprising the steps of:

encoding spatial information relating to a feature or features contained within an image into the form of one or more musical sequences; and playing the musical sequence or sequences to the person.

Figure 1:
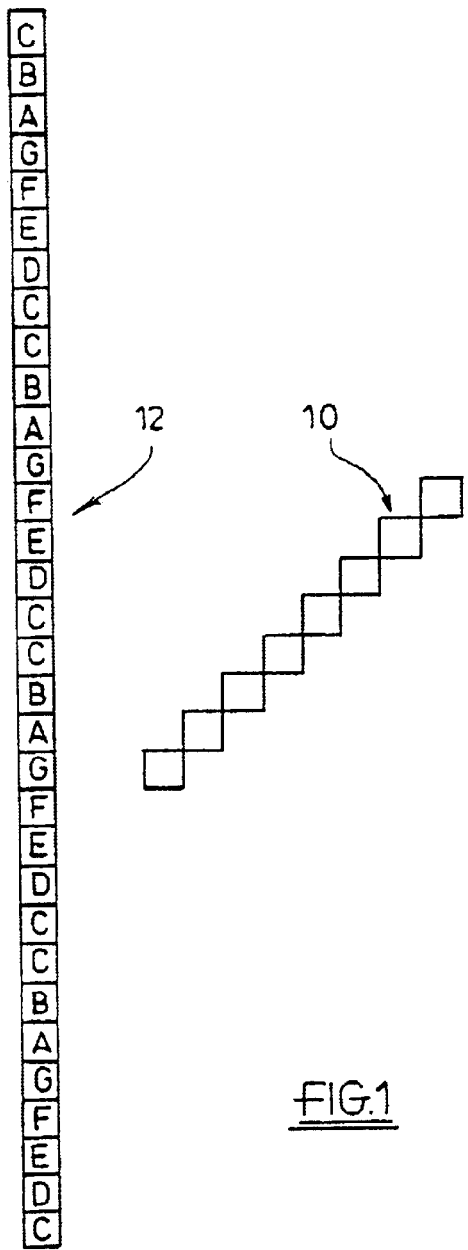
FIG. 1 shows a first 2D feature.

FIG. 1 illustrates how the encoding may be performed on a computer generated 2D feature 10. The image 10 is, essentially, an arrangement of filled pixels which have been selected from a matrix of pixels. The musical sequence is produced by associating a different note with each pixel along a column of pixels and, if a feature is recognised as being present in a pixel, the note corresponding to that pixel comprises part of the musical sequence. If a feature occupies more than one pixel in a given column. then a number of notes are played simultaneously, producing a chord. The entire image is encoded by performing this procedure for each column of pixels, thereby producing a sequence of notes or chords.

In FIG. 1, this encoding procedure is performed using a moveable cursor 12. The cursor 12 is divided into 32 segments corresponding to the notes in four octaves of the scale of C major (which comprises, in ascending order, the eight notes C D E F A B C). The cursor 12 defines a Y axis. Thus, features are encoded by selecting a note or chord dependent on the distribution of the feature along the Y axis. Encoding proceeds by moving the cursor 12 along the X axis, from left to right as viewed in FIG. 1. Each movement of the cursor 12 samples a new column of pixels. If the cursor 12 encounters one or more filled pixels (corresponding to a portion of the feature 10) then the note or notes corresponding to the segments of the cursor 12 which have encountered the filled pixels are played. Thus, if the cursor 12 is moving across the screen the screen at a velocity of p columns of pixels per second, the time between the playing of successive notes or chords is 1/p seconds.

In other words, spatial information corresponding to the shape of the figure in Cartesian coordinates is encoded, or transposed, into a musical sequence in which the Y ordinate is represented by musical notes and the X ordinate by time.

Returning to the specific example shown in FIG. 1, it can be seen that movement of the cursor 12 over the feature 10 will result in the playing of a musical sequence on which the ascending notes G, A, B, C of the second lowest octave and C, D, E, F of the second highest octave are played in succession.

Figure 2:
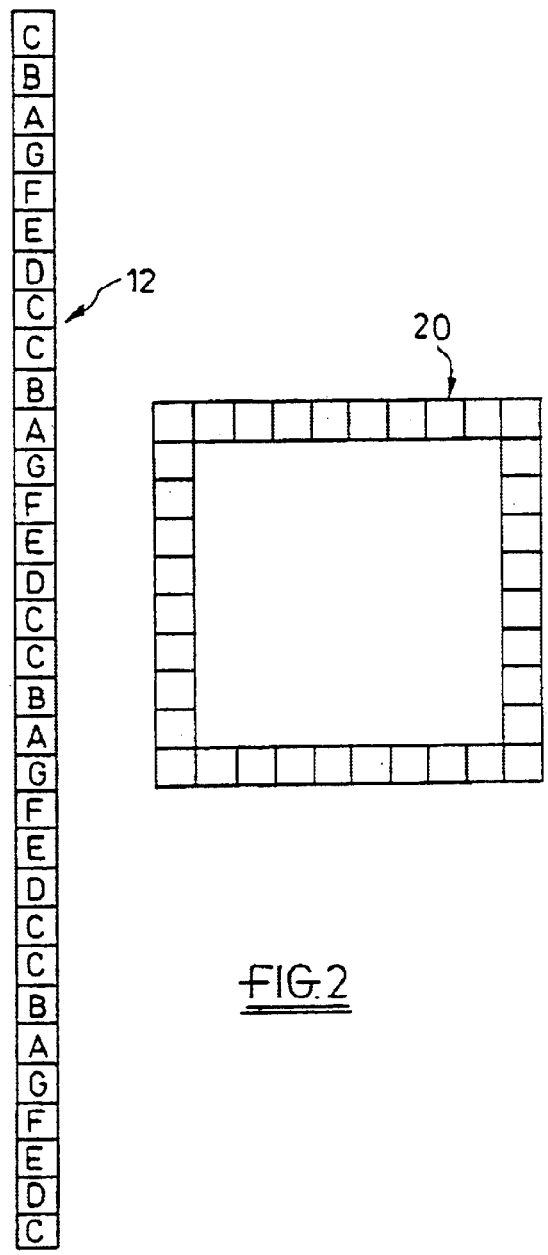
FIG. 2 shows a second 2D feature.

As a further example, FIG. 2 shows a computer generator square FIG. 20 which also comprises a number of filled pixels. When the cursor 12 is moved across the square 20, the first component of the musical sequence is a chord which comprises the ten notes A, B, C of the second lowest octave and C, D, E, F, G, A, B of the second highest octave. The number of notes involved results in a chord which gives the impression of density or thickness. The next eight components of the musical sequence are chords in which only two notes, A and B, are played, these notes corresponding to the top and bottom sides of the square 20. The result is a sound which might be described as "thinner". The final component of the musical sequence is the chord comprising the ten notes.

The use of the scale of C major (which does not contain flats or sharps) is not limiting: other musical scales may be used. Indeed, since the four octaves utilised in the above examples represents, approximately, the range of human hearing, thus limiting the Y axis resolution of the encoded image, it may be advantageous to utilise the chromatic scale. In principle, the image might be encoded using a different coordinate system than Cartesian coordinates, such as polar coordinates.

Figure 9:
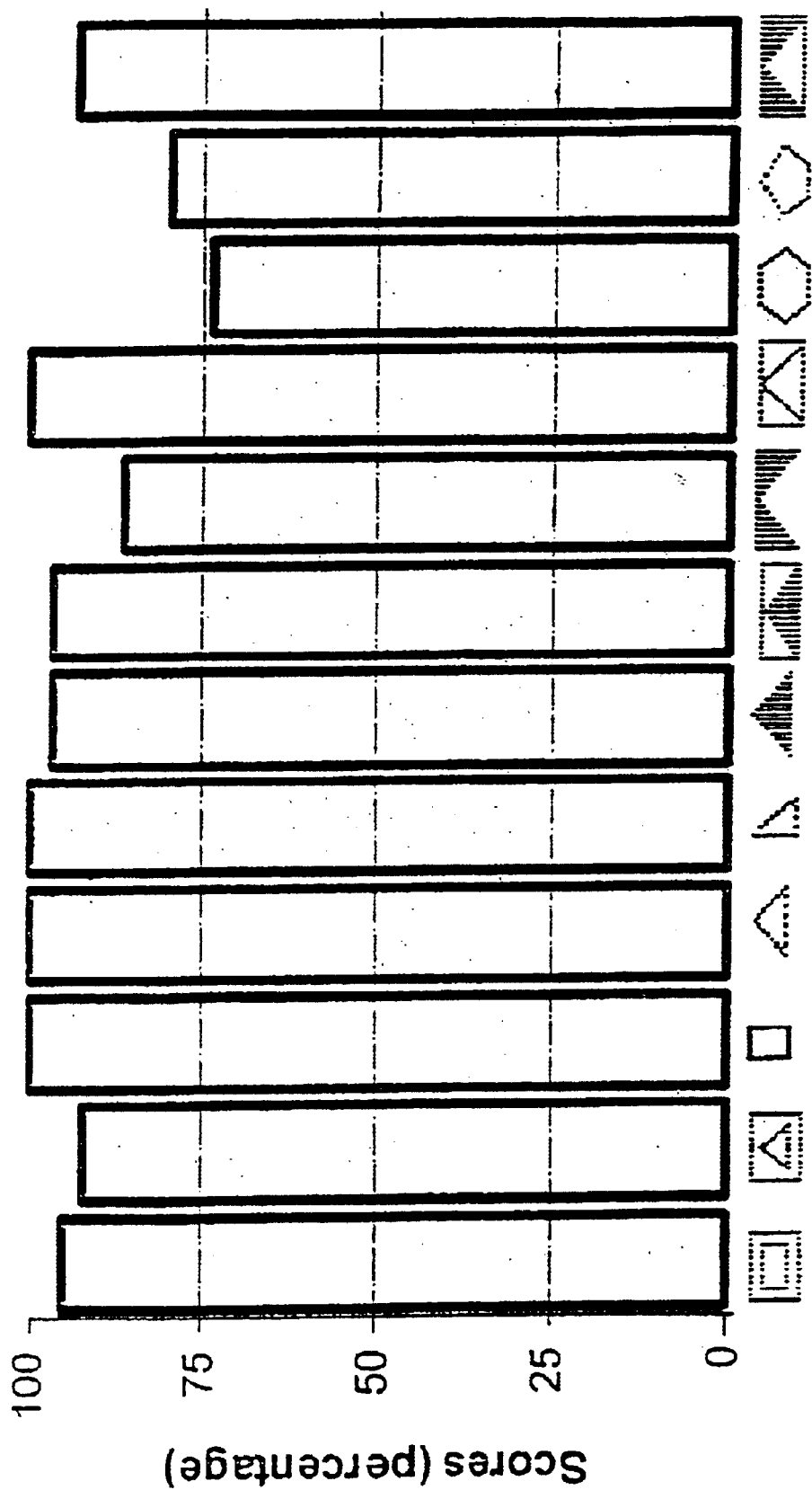
FIG. 9 shows recognition scores from subjects presented with complex geometrical shapes.

A computer program was written in the C++ language, running under the Windows (RTM) operating system to enable 2D shapes and objects to be encoded using the approach described above. A Musical Instrument Digital Interface (MIDI) allowed interfacing to a sound card in order to play the musical sequence. Confidential tests were performed, using the software, on a number of blind subjects, and on (blind folded) sighted subjects. Extremely favourable results were obtained in tests which employed a variety of geometric shapes and letters. For example, subjects were quickly able to read simple words, having been trained on individual letters. Furthermore, subjects were able to recognise figures consisting of one geometric shape contained within another shape, (such as a triangle within a square), having been trained on the individual component geometric shapes. FIG. 9 shows the recognition scores obtained to a series of geometric shapes of differing complexities.

Global Perception of Animal Perception Translated into Species Specific Rhythmical Pattern of Sound In a further development, it is possible to visualise moving features by playing a plurality of musical sequences corresponding to different positions and/or orientations of the moving feature. In this way, dynamical information can be visualised in a way which bears similarities to the principles of cinematography, in which successive frames showing different stages of the movement are shown.

Figure 3:
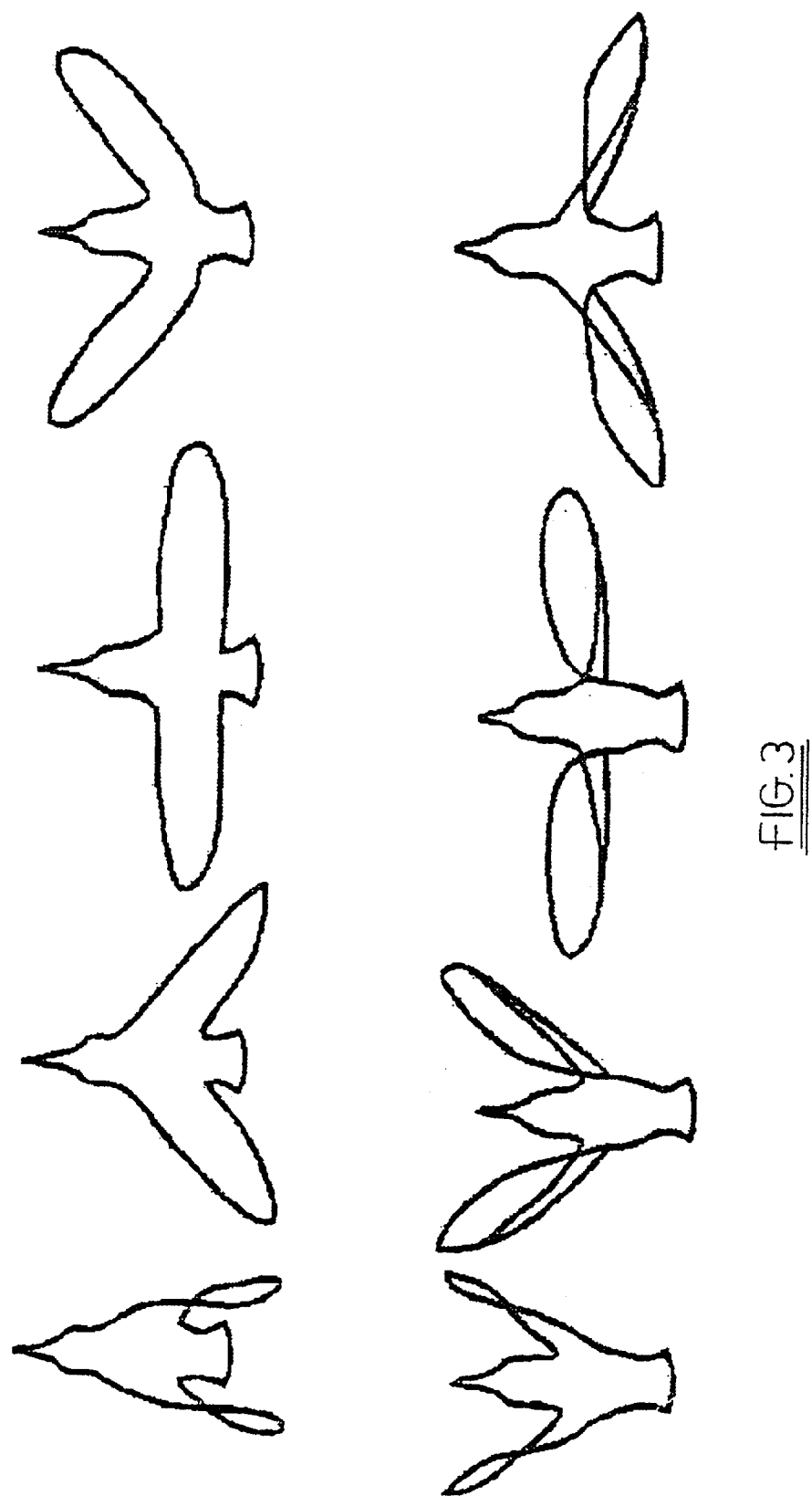
FIG. 3 shows a sequence of locomotory motions of a bird.

The computer program described above was adapted to produce a series of images which simulate the locomotory sequence of limb movements displayed by a variety of animal species, namely i) a galloping horse; ii) a running cheetah, iii) a walking man; iv) a flying bird; v) a swimming fish; vi) a bipedal lizard; vii) a quadrupedal lizard; viii) a wriggling worm; and ix) a crawling locust. FIG. 3 shows a sequence of images containing the feature of a flying bird.

Successive musical sequences, corresponding to different "frames" in sequences of images such as that shown in FIG. 3, were played to subjects in the confidential tests. Blindfolded normal and previously sighted blind subjects, were able to distinguish between the different locomotory motions and, in some instances, were able to correctly identify a locomotory motion with no previous training using the locomotory motion.

Cross-Modality Perception of Complex Stationary Visual Images Translated into Sound We now turn to the problem of encoding more complex images. The approach adopted is to substantially mimic, in a number of aspects, the operation of the human eye.

An important aspect of the present invention is the realisation that it is often advantageous to encode a subset of the full image into a musical sequence or sequences. Predetermined features can be extracted from the image, and said predetermined features may be encoded into a musical sequence or sequences. Feature extraction or pattern recognition algorithms can be used for this purpose For complex images it was necessary to extend the battery of search strategies available to our subjects to enable them to carry out a satisfactory exploration and analysis of the target. These included (1) a facility to mask or block out areas of the image to enable the subject to carry out a patch by patch exploration and analysis of the target and to selectively examine portions of the image. This was introduced in an attempt to simulate the tactile search pattern that a blind subject normally carries out when tactually exploring the shape of a solid object. (2) The second major change was to carry out a strategy of feature extraction to segment and produce a set of simplified representations of the image. In our original scheme, the entire image of the "object" was displayed on the computer screen and all pixels constituting the image were thereby primed to activate the release of the appropriate musical notes (that signalled their respective locations on the screen) when they were intercepted by the moving tracker bar. To be fully primed it was necessary and sufficient only that a pixel be occupied by part of the image on the screen. To facilitate the analysis of more complex visual shapes we introduced several additional conditions that needed to be fulfilled before a pixel is fully primed to activate the tracker bar. Effectively this is equivalent to having the full image of the "object" appearing on the monitor screen simultaneously by several different spatially distributed sets of feature detectors that each select only those pixels included in those parts of the image that display the selected feature to which a particular array of detectors is tuned. Thus one array of orientation selective detectors may select for priming any set of pixels that lie on well defined vertical lines in the image, while another array of feature detectors may do the same for horizontal lines etc. Further provision is made to allow the subject the choice (i) of selecting which feature (or combination of features) of the image are to be presented and (ii) which "voices" are to be excluded during a particular presentation. By screening the image with several sets of detectors which select for different features (e.g. horizontal, vertical and oblique line components), we can generate musical patterns associated with an image in which all but one of the features have been removed or an image that combines simultaneously a number of selected features (such as vertical and horizontal line components) for sounding the whole figure i.e. by priming all the pixels and by arranging to scan and sound all the "voices" (segmented parts of the melody) simultaneously. Effectively this allows the subject to isolate and separately examine the contents of several segmented packages in which different features of the image have been sequestered.

Feature Extraction and Image Simplification

In the case of complex images, it is often confusing to a listener if the full image is encoded, because the associated musical sequence is too complex. By encoding only certain features, it becomes easier for a subject to distinguish, or resolve, identifiable features. There are a numbers of ways in which the encoded information might be presented to a listener. One way is to play a single, simplified musical sequence to the person. Alternatively, numerous musical sequences might be played: there are a number of ways in which a plurality of musical sequences can be presented to a person, and these are discussed below.

Figure 6:
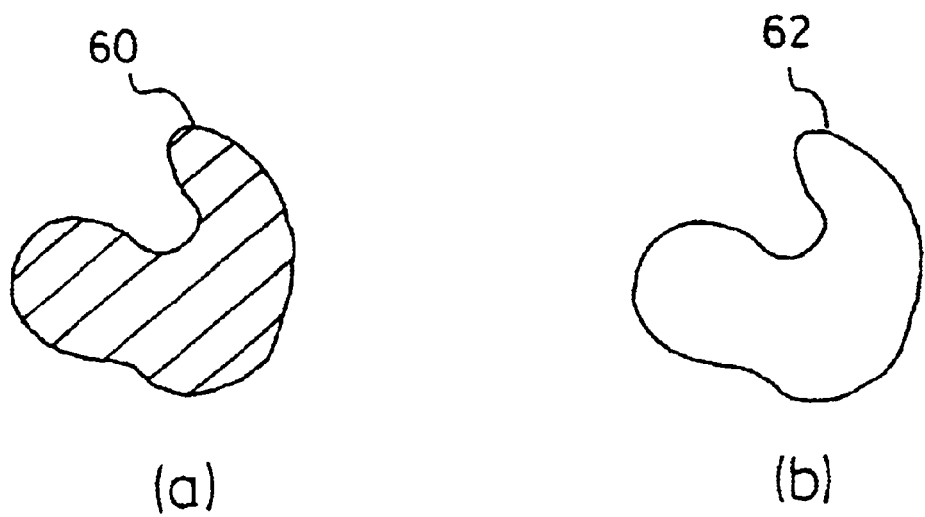
FIG. 6 shows a) a solid object and b)processsed to highlight the contour of the solid object by image erosion.

Individual features present in an image can themselves be of complicated shape and form. A feature can be simplified by encoding a portion of the feature as a musical sequence. Eroding the Image to Sharpen and Extract Object Contents One example of this is if a feature is a solid object, such as the object 60 shown in FIG. 6a. Encoding the entire object 60 into a musical sequence would result in a long series of chords each containing multiple notes. It is difficult for a subject to distinguish finer details of the scope of the object 60 from such a musical sequence. It is advantageous to encode only the edges of the object 60 as a musical sequence, resulting in a sequence which is more tractable to the subject. This can be achieved by pre-processing the object 60 to produce an outline object 62 (FIG. 6b). The outline object 62 is then encoded.

Another example of feature simplification is provided by encoding different portions of a feature as different musical sequences. The different portions can comprise, for example, vertical lines, horizontal lines or sloping lines present in the feature.

EXAMPLE

Figure 7:
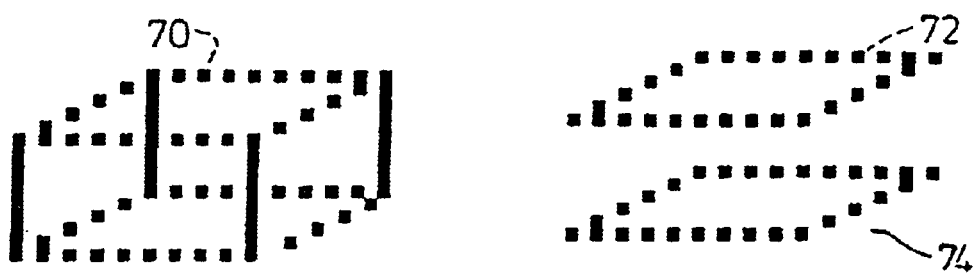
FIG. 7 shows a) a Necker cube, (right) a Necker cube with vertical lines removed, (b) sketches made by subject P.H., and c) sketches made by subject BK.
Figure 7:
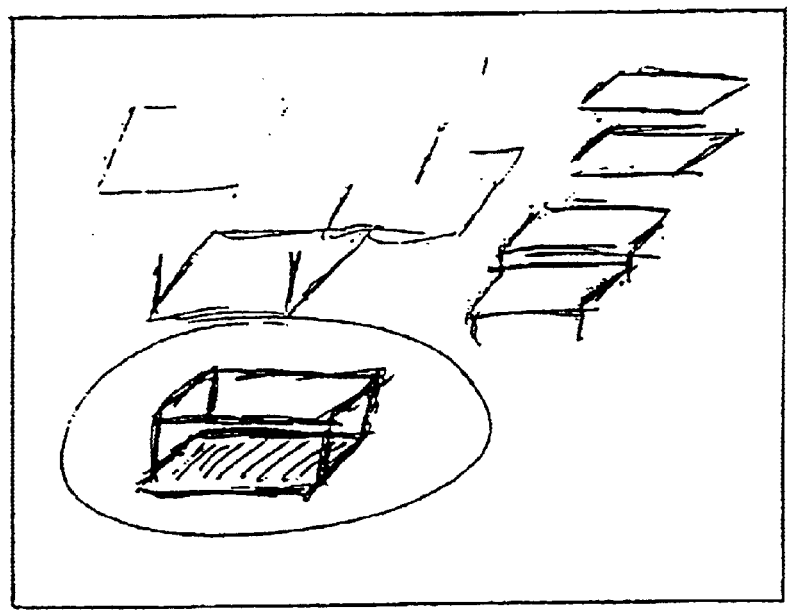
Figure 7:
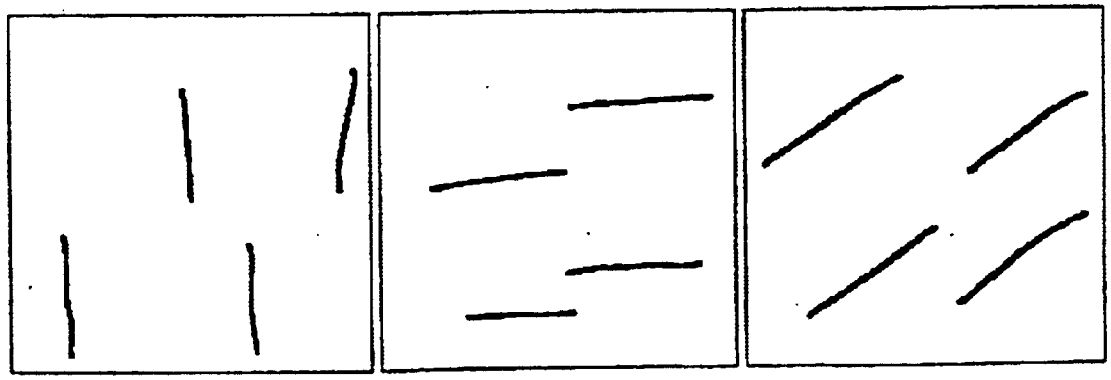

FIG. 7 shows a Necker cube 70, which is a two dimensional representation of a wire model of a cube. In confidential tests, subjects were presented with the musical sequence associated with the Necker cube. Before the presentation each subject told that the feature was a 2-D representation of a 3-D wire model of some object, and they were required to analyse the sound pattern, and from this, to reconstruct its form. A sighted subject PH was given a drawing pad and invited to sketch the shapes he inferred from listening to the sound pattern during the process of reconstruction (see FIG. 7b). A blind subject BK was reluctant on this occasion to attempt any drawing while performing the task but did produce one later when asked how he had analysed the shape.

Test procedure for PH. (i) Subject was allowed to listen to a series of presentations of the whole Necker cube FIG. 70. He reported that the task was "difficult". (ii) Experimenter suggests he simplify the figure and did so by removing the vertical struts and presenting the subject with the two rhomboid surfaces 72, 74 depicted in FIG. 7a (right). After listening to a number of presentations of the deconstructed figure the subject asked for the original whole figure to be played back to him. PH then produced a series of sketches in which he reconstructed the Necker cube.

Test procedure for BK. The subject was given the same instructions as PH except that on this occasion, BK chose not to draw but to analyse and reconstruct it mentally and give a verbal description. After listening to several (sound) presentations of the entire Necker cube figure, and without it being segmented or disassembled, BK declared that he was able to analyse the basic line elements and their spatial arrangement relative to one another, whereupon he identified the figure as a "cube". When asked later to illustrate how he had done this he produced the set of drawings depicted in FIG. 7c.

The amount of feature simplification can be varied as a user learns to recognise more complicated structures. Thus, once a user has learnt to recognise these, they can be used by the subject as building blocks with which to analyse more complex figures. A user might learn to recognise a feature by listening to a portion of the feature, and then returning to the musical sequence corresponding to the entire feature, such as described in the Example. Alternatively, the entire feature might be encoded by encoding different portions of the feature as different musical sequences. In a trivial example, a square might be encoded by forming one musical sequence corresponding to the two vertical lines of the square, and forming another musical sequence corresponding PA to the two horizontal lines. The two musical sequences might be played to a subject in series, i.e., sequentially, or, more subtly, in parallel.

Representing and Processing Images to Different Levels of Resolution

Figure 4:
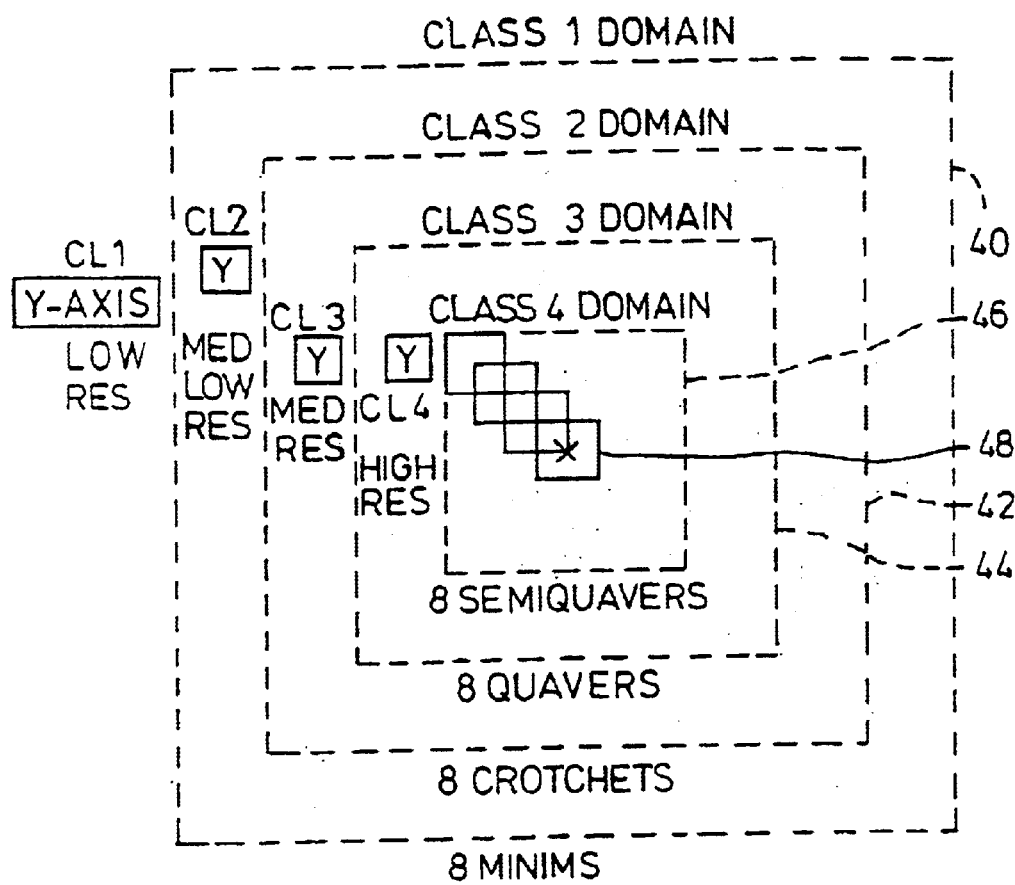
FIG. 4 shows the division of an image field into a number of zones of different resolution.

FIG. 4 shows how an image might be divided into a number of concentric domains or zones 40, 42, 44, 46, for the purpose of encoding an image. The spatial resolution, i.e. the size of the pixels used to produce a musical sequence, is different in each zone 40, 42, 44, 46. More specifically, the image defined by the largest zone 40 is encoded at the lowest resolution, zone 42 corresponds to a medium resolution, zone 44 corresponds to a medium/high resolution, whilst the image defined by the smallest zone 46 is encoded at the highest resolution. The use of four zones in this way is similar to the structural divisions of the fundus of the human eye, in which visual activity is highest at the foveola, in the centre of the retina, and diminishes going radially from the centre of the retina, through the foveola, fovea, parafovea and perifovea. The use of four concentric zones is not limiting: different numbers of zones might be employed. In principle, the zones need not be concentric, although, for reasons outlined below, this configuration is strongly preferred.

This constitutes preprocessing which utilizes a selective process of feature extracting modules to first deconstruct the image into separate packages; then convert them into equivalent musical phrases and presents these to the subject as the several "voices of a polyphonic melody", and is an extremely important tool for analysing the structure of complex images.

Basic Icons Extracted Can be Used in the Analysis of Simple Shapes

The visual system of mammals and primates, contains neurons sensitive to line orientation that are an important subset of the feature selective elements in the brain that play a key role in the analysis and perceptual representation of visual forms. In the immature brain they and other feature detectors, may represent the functional building blocks (basic icons) for the later assembly, through learning, of more elaborate and sophisticated feature detectors (learned icons), that preprocess visual information in parallel and are used by the experienced adult brain, to speed up analysis and perception of the visual world. Following this line of reasoning we supplied our subjects (blind, and normal (blindfolded) alike) with a verbal description of the musical equivalent of a set of basic line elements which they were instructed to utilise to analyse the characteristic sound signatures generated by different shapes and to use this information to reconstruct the visual form. They were also encouraged to explore the figure for symmetrical features that may help them in the task of visual contour identification.

It will be apparent that it is possible to observe a scene at low resolution, and then to pan it so that individual features can be resolved at higher resolution receptive fields. Furthermore, the configuration of FIG. 4 might be used to view a scene or object in saccadic fashion. Saccadic eye movements are rapid, ballistic movements of the eyes used in scanning a scene or object. They are used to locate the portion of the image of interest onto the fovea i.e. the zone of the retina with the finest granularity and resolution. An example is facial recognition in which the eye motion rapidly and successively puts features such as eyes, nose and mouth in the central, high resolution foveola and fovea zones of the retina Due to time taken in playing a musical sequence, such saccadic movements using the present invention will be less rapid than in the human eye. However, it is quite feasible that a low resolution image, encoded using the present invention, might be used to indicate features of interest which are successively brought into the central portion of the image for visualisation at high resolution.

Figure 10:
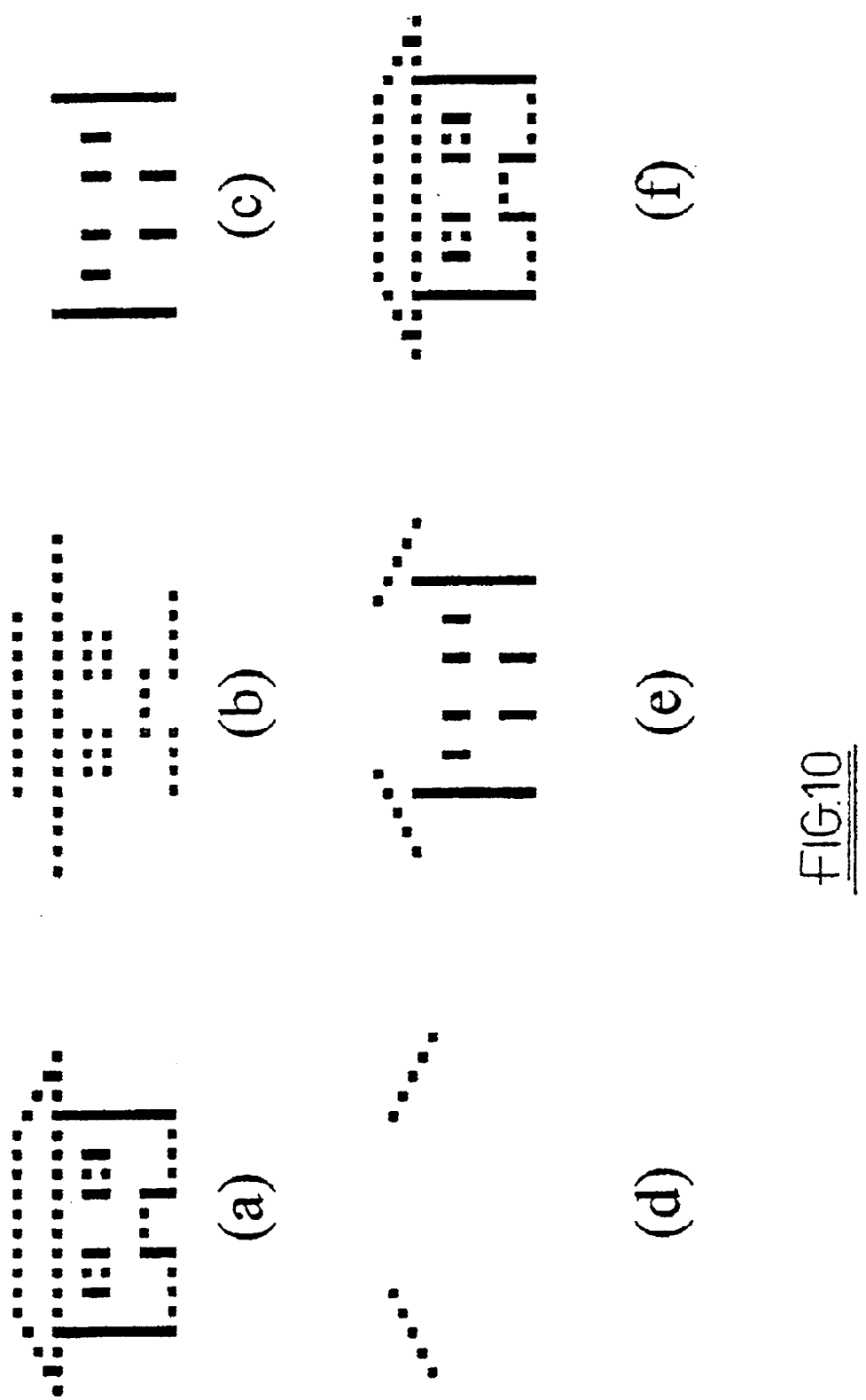
FIG. 10 illustrates segmentation of a complex object (a house) to produce basic icons that a subject can recognise as a sequence of polyphonic melodies.

From the foregoing, it will be apparent that image or images can be segregated into a plurality of musical sequences, corresponding, for example, views at different resolutions, saccadic compilations of several related images, and "special" sequences relating to certain "programmed" features. These separate auditory representations may be bound into a single percept by the use of melody. Consider an example in which the outline of a house is presented on one sequence, followed by the finer details of features (FIG. 10).

The image of the house would then be encoded in a (repeated) musical melody in which the outline of the house featured as the contents of one window, and other features etc contained in the other.

Figure 5:
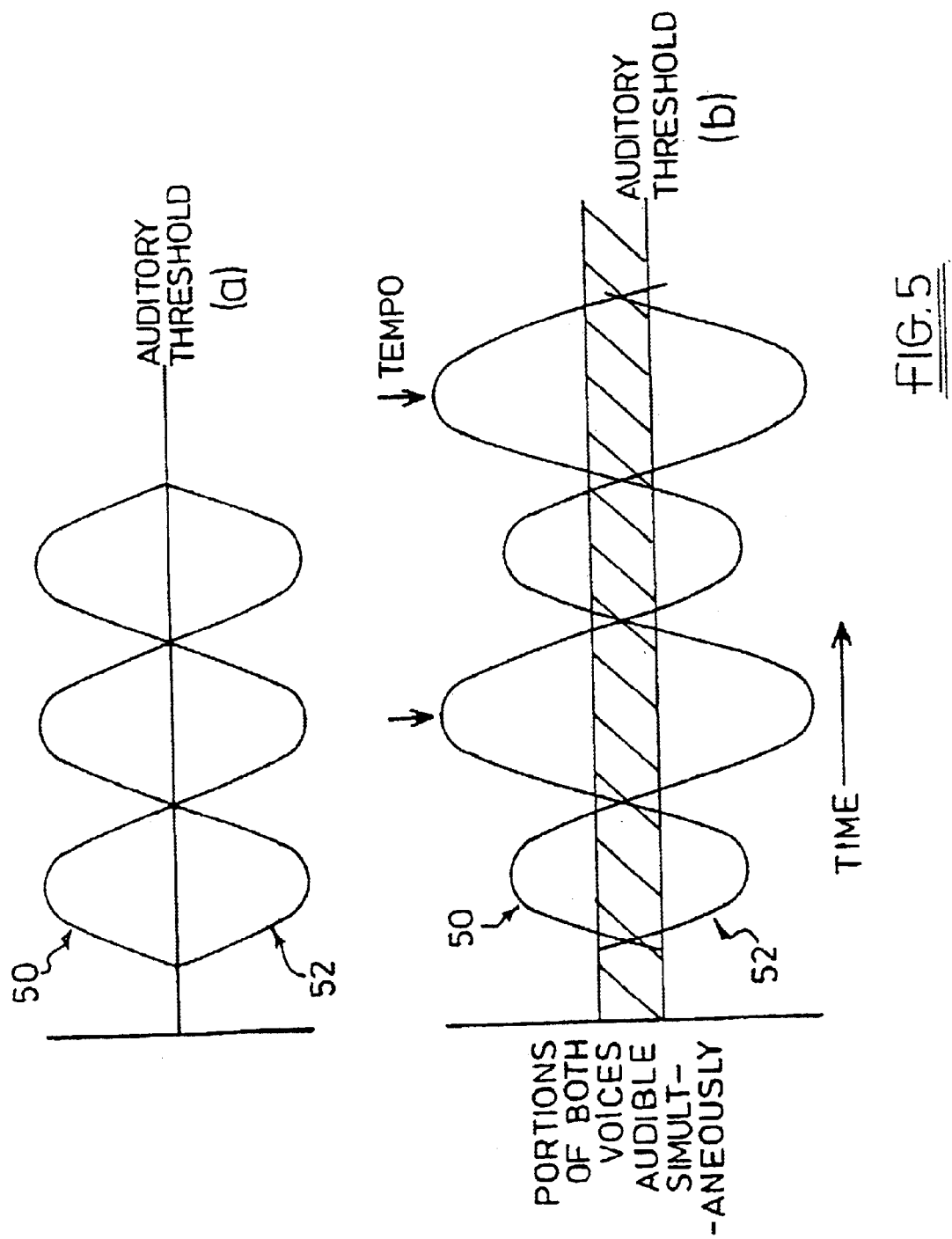
FIG. 5 shows the coupling of different musical sequences in a melody.

To generate the "melody" (which encompasses the contents of both windows) and to preserve a sense of the "spatial" relationships between them we introduce two additional modifications:

(i) FIG. 5a illustrates how to alternate the presentations by modulating the sound intensity of each window presentation 50, 52 above and below the auditory threshold and arranging for the intensity modulation of the two presentations 50, 52 to be 180 degrees out of phase.

(ii) FIG. 5b shows the continued modulation of the sound intensity of presentation 50, symmetrically about the auditory threshold. For the other presentation 52 we shift the baseline of its modulation a fraction up, so that it lies some distance above the auditory threshold. Thus we have introduced:

(a) a tempo which musically brackets the contents of the two windows within the simple melody (b) a short interval at the start and end of each cycle when a portion of each window may be heard simultaneously—one rising in intensity, the other decreasing.

Thus by simply shifting the modulation baseline of one or the other above or below the auditory threshold one may selectively present and listen to:

(i) the contents of one of the "voices".

(ii) generate a full alternation of the contents of each window.

(iii) a tempo that brackets the contents of the two windows: allowing the observer to perceive them as a single entity (much as the theme tune of a song).

(iv) portions of both windows simultaneously.

FIG. 11 illustrates the responses to such an approach by subjects tested on segmented complex images (a boat, a staircase, a house, a castle).

The confidential experiments demonstrate that blind (previously sighted but lacking light perception) and blindfolded(normal) subjects can utilise the sound representations of visual images to analyse the structure of novel (and relatively complex) visual forms. They achieve this by deconstructing the figure into its constituent line elements and from there proceed to a fairly accurate reconstruction and description of the whole figure. Whilst in some instances they failed to correctly name the object, they were nevertheless still able to produce an accurate description or sketch of the figure presented to them (e.g. the house and castle in FIG. 11). This shows that we were not simply providing the subject with a dictionary of complex sounds that are associated with specific objects but are providing them with the tools with which to analyse novel complex objects in terms of simpler building blocks (e.g. basic line elements) whose associated sound signatures they had either learned previously or appeared to recognise naturally (FIGS. 1,2) Once subjects have successfully carried out an analysis and identified a visual form we find they progress to being able to recognise and isolate more complex features of the object which they subsequently use as higher level cues (new feature detectors that are established through learning) to facilitate recognition on subsequent presentations of the object (and in some cases becoming a high level feature detector whose selectivity is for the object itself). Whatever the sensory modality, the use of feature detectors to segment a complex stimulus pattern, seems to be the key to analysing (and reconstructing) novel complex shapes.

This approach can be extended using principles well established in musicology in order to generate and modulate complex melodies with many subsidiary "voices". Each "voice" contains visual information, and furthermore, visual information can be contained in the relationships between the "voices". The individual musical sequences might utilise different waveforms, i.e. different instruments or different voices might be allocated to different musical sequences, giving rise to considerations of harmony.

The colour of features can be represented using the present invention. In classical colour theory, the perception of colour is generated through the differential absorption of different wavebands of light by the visual pigments contained in 3 types of photoreceptor which serve as primaries. Any 3 coloured lights can serve as primaries provided only that when mixed together in suitable proportions they produced the sensation of "white" and perhaps more importantly: on condition that it should not be possible to match one of those by linear combination of the other two.

One way of achieving such colour mixing with the present invention is to select a master waveform corresponding to a musical instrument which spans a reasonable range of octaves and whose notes contain a rich range of harmonic overtones. A triad of primary waveforms, for every notes in the span of octaves employed in the musical sequences, is generated as follows:

(i) To generate the "long wavelength" version of that note we use a sound bandpass filter to remove some of the medium and higher frequency components from the sound normally generated by that note.

(ii) For the "medium wavelength" version of the same note we follow the same procedure except that we filter out some of the high and low frequency components.

(iii) For the "short wavelength" version we filter out some of the low and medium frequency components.

(iv) Next we adjust the relative intensities of the triad generated so that when they are sounded together they retrieve the sound generated by the original note (which serves as the achromatic note in the set).

(v) This triad should satisfy the principal condition required of a set of colour primaries: namely that it should not be possible for the sound of any one of the triad to be matched by a suitable (intensity) mixture of the other two.

The procedure described above is repeated for each note in the entire set of octaves utilised by the present invention. However to obtain a suitable set of triads for each note, the characteristics of the bandpass filters need to be altered in each case to take account of the change in pitch of the zero harmonic (fundamental) as we progress up or down the scale of notes.

An alternative method—the method of choice—is to employ three different musical instruments that differ in the sounds produced but having the same fundamental frequency encoding pixel position. Colour coding may be achieved by mixing the three harmonic sets in desired proportions. Thus a point can be represented both by the position and by colour together.

Spatial Characteristics of Visual Displays

The system may also be used to translate image motion cues (such as differential movement, parallax, changing size) into equivalent sound patterns which can be utilised to segregate figure from background in 3D and produce information on the relative depth between visual objects.

The present invention provides devices enabling a person to visualise images. Such devices comprise: imaging means for obtaining images of a feature or features; encoding means for encoding spatial information relating to the feature or features in the manner described above; and playing means for playing the musical sequence or sequences to the person.

The imaging means can comprise a video camera, although other means, such as CCD or photovoltaic detectors, might be employed. The encoding means performs the functions of analysing the image produced by the imaging means in a suitable manner, and encoding the analysed image into suitable musical sequences. The analysis step might comprise the division of the image, or portions of the image, into the desired number of pixels. It is of course highly desirable that the device is portable, and thus a small, dedicated microprocessor might be used as encoding means. A small video camera can be used as part of a portable device: the video camera can be incorporated into a hand-held "wand." In both instances, scanning movements can be accomplished by the person via hand motion or automatically. The playing means can comprise an ear-piece worn by the person.

Figure 8:
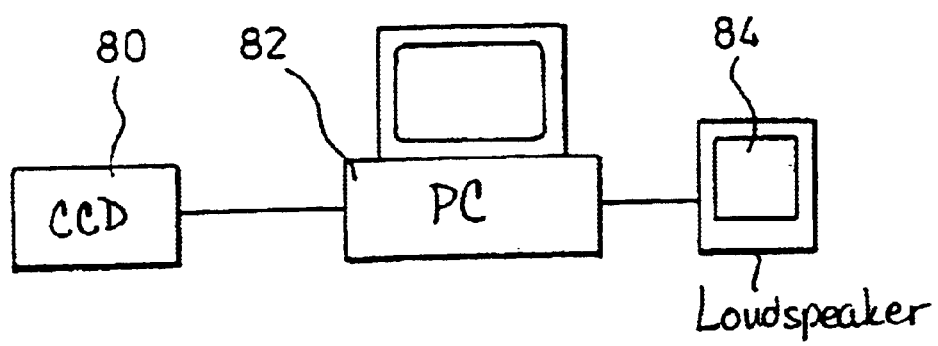
FIG. 8 is a schematic diagram of an apparatus to enable a person to visualise images.

FIG. 8 shows a system comprising a CCD camera 80 which captures images and relays the data to a personal computer (PC) 82. The PC 82 is adapted, through the use of suitable software, to perform certain preprocessing of the data and to generate, in real time, appropriate musical sequences using the MIDI protocol. The PC 82 is interfaced to a sound card (not shown) which permits musical sequences to be played on a loudspeaker 84.

Preprocessing of the image captured by the camera 80 proceeds according to the following scheme:

1. The image is positioned on a grid comprising a plurality of pixels. The pixel size is variable, thereby permitting variation of the spatial resolution.
2. The image is thresholded, so that each pixel in the grid is either black or white. Selection of achromatic pixel colour (black or white) is dependent on whether intensity of the image within the pixel exceeds a predetermined threshold.
3. The edges of the features present in the image are detected. Various filters for these purposes are know in the art: in this embodiment, a Sobel filter or a Laplace filter can be used.
4. "Erosion" of solid objects is performed to produce an outline object of the type described previously in relation to FIG. 6b. The resulting outline object consists only of edges: this processing simplifies the musical sequence associated with the image, and improves subsequent shape or feature recognition steps.
5. Musical notes are assigned in order to encode the image. This is achieved by using a net of relatively large "grid elements" in which each grid element contains a number of pixels. The average intensity of the pixels in a grid element is calculated, and a note is assigned to the grid element only if a predetermined intensity threshold is exceeded. This process reduces the spatial resolution of the encoded images, but, very usefully, reduces the effect of noise in the image. In this non-limiting embodiment, a total of 53 white scale notes are employed, i.e., the Y axis of the encoded image comprises 53 subdivisions.

The software offers numerous additional facilities. Shape recognition algorithms can be selected to recognise, for example, edges, corners, circles, straight lines etc. Boolean logic operators AND and OR can be employed to compare consecutive images, either before or after preprocessing. This is useful inter alia for detecting movement of objects.

Due to the digital nature of the data, it is possible to zoom in and out of the image using the software.

It would be possible to produce a portable version of this system by replacing the PC 82 with a compact unit comprising a dedicated microprocessor. Musical sequences can be played to a user with an ear piece.

What is claimed is:

1. A method enabling a person to visualise images comprising the steps of:
   encoding spatial information relating to at least one feature contained within an image into the form at least one polyphonic musical sequences;
   playing the at least one polyphonic musical sequence to the person; and,
   wherein a subset of a full image is encoded into the at least one polyphonic musical, the step of encoding a subset of a full image comprising recognizing and extracting predetermined features from the image, and encoding said predetermined features into at least one polyphonic musical sequence.

2. A method according to claim 1 in which spatial information is encoded by selecting a note or chord dependent on the a distribution of the at least one feature along an axis.

3. A method according to claim 1 in which the image comprises a letter or a number.

4. A method according to claim 1 in which the image comprises the person's environment.

5. A method according to claim 1 in which spatial information is encoded by:
   representing the image as a 2D image;
   forming one or more musical sequences, each comprising a series of notes or chords, in which i) each note or chord is selected dependent upon a distribution of the at least one feature along a portion of the 2D image, and ii) different notes or chords in a sequence correspond to different portions of the 2D image.

6. A method according to claim 5 in which the 2D image, or a portion of the 2D image, is divided into a matrix of pixels, and i) each note or chord is selected dependent upon the distribution of the at least one feature along a column of pixels and ii) one of either different notes and chords in a sequence correspond to the distribution of the at least one feature along different columns of pixels.

7. A method according to claim 6 in which a different note is associated with each pixel along a column and, if a feature recognised as being present in a pixel, the note corresponding to that pixel comprises part of the musical sequence.

8. A method according to claim 5 in which the 2D image, or a portion of the 2D image, is divided into a matrix of pixels, and i) each note or chord is selected dependent upon the distribution of the at least one feature along rows of pixels and ii) one of either different notes and chords in a sequence correspond to the distribution of the at least one feature along different rows of pixels.

9. A method according to claim 1 enabling a person to visualise moving features comprising the step of playing a plurality of musical sequences corresponding to different positions of the moving feature.

10. A method according to claim 1 in which a feature is simplified by encoding a portion of the feature as a musical sequence.

11. A method according to claim 10 spin which the feature is encoded by encoding different portions of the feature as different musical sequences.

12. A method according to claim 1 in which the image is encoded into the form of a plurality of musical sequences which are played to the person as a melody.

13. A method according to claim 12 in which the image is encoded as a plurality of musical sequences, each corresponding to different spatial resolutions.

14. A method according to claim 13 in which the image has a centre, and the image is divided into two or more concentric zones, the zone at the centre of the image being optionally encoded at a higher spatial resolution than the spatial resolution of the zone furthest from the centre of the image.

15. A method according to claim 14 in which a feature or features are visualised by obtaining a plurality of images in a saccharic-like series of movements, functionally equivalent to a scan path that an eye follows when it examines an object.

16. A method according to claim 13 in which the notes and chords in the sequence have a duration, and the spatial resolution corresponding to a musical sequence is indicated by the duration of the notes and chords in the sequence.

17. A method according to claim 1 in which a colour of the at least one feature is encoded by producing at least one musical sequence which comprises a plurality of different sets of waveforms mixed in variable ratios, wherein the different sets of waveforms correspond to different sounding instruments having different characteristic harmonic waveforms.

18. A method according to claim 17 in which three waveforms are mixed in variable ratios.

19. A method according to claim 18 in which the three waveforms are produced by filtering a master waveform between different frequency ranges.

20. A method according to claim 1 in which the at least one feature has a brightness and the at least one musical sequence has an intensity associated therewith, and wherein the brightness of the at least one feature is encoded by varying the intensity of the at least one musical sequence or sequences.

21. A method according to claim 1 in which image motion cues are translated into equivalent sound patterns which are utilised to segregate foreground features from background in 3D and produce information on relative depth between features.

22. A method according to claim 1 enabling a person to visualise moving features comprising the step of playing a plurality of musical sequences corresponding to different orientations of the moving feature.

23. A device enabling a person to visualise images comprising:
   imaging means for obtaining images of at least one feature;
   encoding means for encoding spatial information relating to the at least one into the form of at least one polyphonic musical sequences;
   playing means for playing the at least one musical sequence to a person; and,
   wherein the encoding means comprises means for encoding a subset of a full image into the at least one polyphonic musical sequence by recognizing and extracting predetermined features from the image, and encoding said predetermined features into at least one polyphonic musical sequence.

24. A device according to claim 23 in which the imaging means comprises at least one video camera.

25. A device according to claim 23 in which the imaging means comprises at least one charge coupled detector.

26. A device according to claim 23 in which the encoding means comprises a microprocessor.

27. A device according to claim 23 in which the playing means comprises an ear-piece.

28. A device according to claim 23 which is portable in which the imaging means is hand-held.

* * * * *